Figure 1:
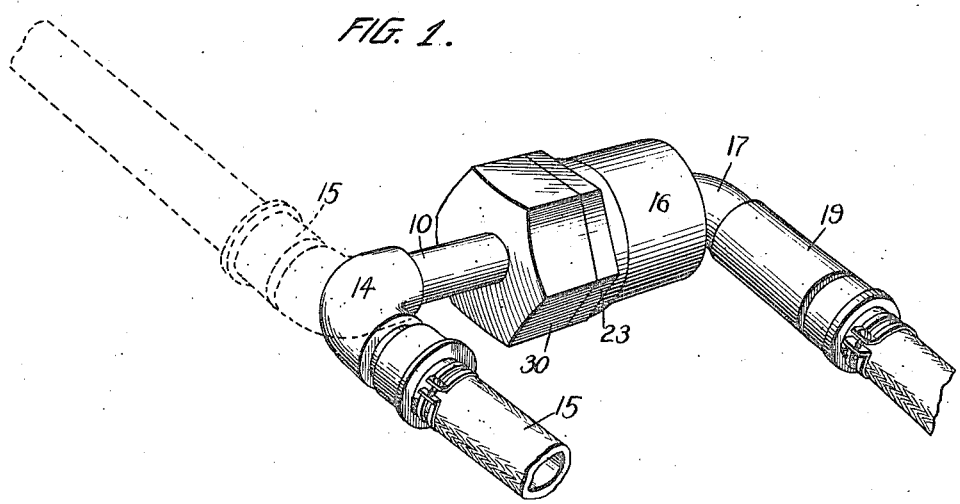

H. AEBLI.
PIPE COUPLING.
APPLICATION FILED AUG. 24, 1916.

1,228,733.

Patented June 5, 1917.

Witness
L. R. Fiedler

Inventor
Henry Aebli
By
Wm. F. Doyle,
Attorney

UNITED STATES PATENT OFFICE.

HENRY AEBLI, OF PORTLAND, OREGON.

PIPE-COUPLING.

1,228,733.                    Specification of Letters Patent.        Patented June 5, 1917.

Application filed August 24, 1916. Serial No. 116,692.

*To all whom it may concern:*

Be it known that I, HENRY AEBLI, a citizen of the Republic of Switzerland, residing at Portland, in the county of Multnomah, State of Oregon, have invented certain new and useful Improvements in Pipe-Couplings, of which the following is a description, reference being had to the accompanying drawings, forming a part hereof.
This invention relates to a steam pipe coupling and particularly to a construction thereof involving a swiveled joint.

The invention has for an object to provide a novel and improved construction of swiveled steam pipe coupling comprising a pipe member having a head to coöperate with a similar member having a socket and a coupling sleeve slidingly mounted upon said head and provided at one end with a recessed seat to bear against the inner surface of the head, and a peripheral edge to contact with the base of the socket surrounding the joint between said head and socket.

Other and further objects and advantages of the invention will be hereinafter set forth and the novel features thereof defined by the appended claim.

Figure 2:
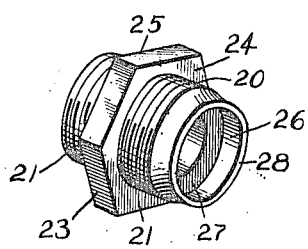
Figure 3:
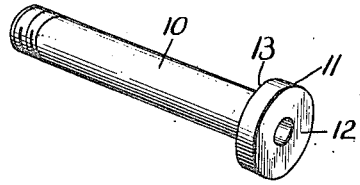
Figure 4:
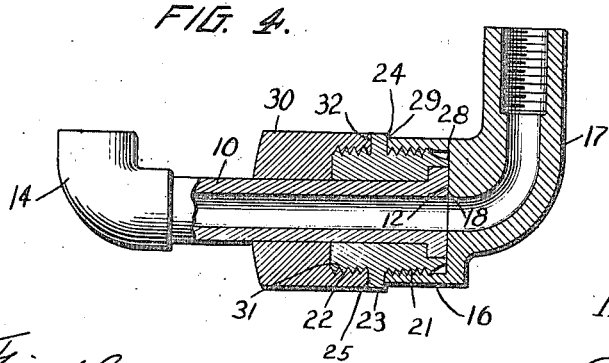

In the drawing,

Figure 1 is a perspective showing the invention applied;

Fig. 2 a detail perspective of the coupling sleeve;

Fig. 3 a similar view of the coupling head, and Fig. 4 a section through the assembled parts.

Like numerals of reference refer to like parts in the several figures of the drawings.

The numeral 10 designates a pipe member provided at one end with a head 11 having an outer ground bearing face 12 and an inner face 13 of similar character. This pipe member is adapted to be assembled for connection in any desired manner, for instance, by means of an elbow 14 with pipe or hose line 15, as indicated in Fig. 1.

Coöperating with the head 11 is a socket member 16 carried by a pipe section which may be either an elbow 17, as shown, or otherwise. The base of this socket at 18 is suitably ground to provide a steam-tight contact with the face 12 of the head. This socket member is connected in any desired manner with a pipe or conducting line 19, as shown in Fig. 1.

Coöperating with the headed pipe member 10 and the socket 16 is a coupling sleeve 20 which is oppositely threaded at 21 and 22 and provided intermediate thereof with a wrench hold or flange 23 having the contact or clamping faces 24 and 25 adapted to coöperate with the other members, as hereinafter described. One end of this sleeve is recessed at 26, as shown in Figs. 2 and 4, and the base thereof provided with a ground bearing 27 adapted to contact with and make a steam joint against the inner face 13 of the head 11, as shown in Fig. 4. The edge 28 of this recessed portion is similarly ground and adapted to bear against the contact face 18 of the socket member and extends peripherally of the head, as shown.

In assembling the parts, this sleeve is adjusted in position, as shown in Fig. 4, so as to force the head 11 into contact with the base of the socket and also the bearing edge 28 thereof against the same surface. This action brings the face 24 of the sleeve against the outer edge 29 of the socket forming a tight joint at that point. A locking nut 30 is also provided and is slidingly mounted upon the pipe member 10 so that the interior threads 31 thereof may engage the threaded portion 22 of the sleeve and the inner face 32 of this nut come into contact with the face 25 of the sleeve, as clearly shown in Fig. 4.

In the operation of the invention, it will be seen that when the clamping sleeve is adjusted in position, three metallic bearings are provided against the socket member. These constitute the bearing of the head of the pipe section against the face of the socket, the bearing of the sleeve peripherally to said head, the bearing of said sleeve against the inner face of said head and the bearing of the wrench flange against the outer edge of the socket. This produces an effective all metal steam or fluid pressure coupling allowing a swiveled movement and avoiding the use of any packing material which would be affected either by heat or pressure. The lock nut also provides an additional bearing against the sleeve so that the invention presents a simple and economically manufactured construction of coupling for steam or other fluid pressure pipes in which no packing material is used which would be affected by the medium passing through the pipe and a tight joint secured which still permits a free pivotal or swinging movement of the section connected for that purpose. While the coupling has been shown as connected by elbows and other details disclosed, it will be obvious that the invention is not confined thereto, as indicated by the accompanying claim.

What I claim is:—

An all metal swivel pipe coupling consisting of a pipe member having a head at one end provided with a recess and a screw-threaded flange, the outer edge of the flange and the base of the recess each being provided with bearing surfaces, a threaded socket member provided with a central bore having a recess at one end, a central peripheral flange and having bearing surfaces at its ends and on opposite faces of said flange, said socket member being mounted in the head of said pipe member with one end bearing in contact with the bearing surface at the base of the recess in said head and one face of its central peripheral flange in contact with the outer edge of the flange on said head, a threaded coupling sleeve mounted on the socket member and inclosing the end thereof, and a revoluble pipe member having a head resting in the recess in the socket member and extending through the socket member and out through the coupling sleeve.

This specification signed and witnessed this 27th day of July, A. D. 1916.

HENRY AEBLI.

In the presence of—
ALBERT STREIFF,
HENRY C. PRUDHOMME.